United States Patent [19]

Komatsu

[11] Patent Number: 5,453,645
[45] Date of Patent: Sep. 26, 1995

[54] ELECTRIC MOTOR

[75] Inventor: Izumi Komatsu, Komagane, Japan

[73] Assignee: Sankyo Seiki Mfg. Co., Ltd., Nagano, Japan

[21] Appl. No.: 831,683

[22] Filed: Feb. 5, 1992

[30] Foreign Application Priority Data

Feb. 8, 1991 [JP] Japan ................... 3-011516 U

[51] Int. Cl.$^6$ ........................................ H02K 7/00
[52] U.S. Cl. ........................................ 310/40 MM
[58] Field of Search ......................... 310/40 MM, 90, 310/91, 273; 360/71, 85, 96.3

[56] References Cited

U.S. PATENT DOCUMENTS 5,114,093  5/1992  Kunimaru et al. ................ 360/96.3

Primary Examiner—Steven L. Stephan
Assistant Examiner—Matthew V. Nguyen
Attorney, Agent, or Firm—McAulay Fisher Nissen Goldberg & Kiel

[57] ABSTRACT

An electric motor comprises a substrate, a bearing holder rigidly fitted to the substrate, a shaft held by a bearing in the bearing holder and a rotor rigidly fitted to the shaft and arranged vis-a-vis a side of the substrate to rotate around the shaft. It also comprises a stationary member fitted to the bearing holder for holding components other than the motor included in an apparatus. Such an arrangement is particularly advantageous for a video tape recorder as it allows a simple and common standard to be implemented for mounting a tape feeding system, a signal retrieving system and other systems of the video tape recorder so that those components may be mounted with improved accuracy. Moreover, with such an arrangement, the number of components of a video tape recorder may be reduced to enhance manufacturing productivity and lower manufacturing cost.

5 Claims, 4 Drawing Sheets

ELECTRIC MOTOR

BACKGROUND OF THE INVENTION a) Technical Field

The present invention relates to an electric motor having a shaft and a bearing holder partly projecting out of the motor main body such as a capstan motor.

b) Background Art

An electric motor having a shaft and a bearing holder partly projecting out of the motor main body such as a capstan motor is normally used for the tape feeding system of a video tape recorder (VTR). FIG. 5 of the accompanying drawings illustrates a capstan motor of a known type.

Referring to FIG. 5, a shaft 4 is received by a bearing 3, which is in turn held by a bearing holder 2 rigidly fitted to a disc-shaped substrate 1 so that a rotor 5 fitted to the shaft 4 and disposed vis-a-vis the lower surface of the substrate 1 can rotate around the shaft 4. The bearing holder 2 is partly projecting out of the upper surface of the substrate the side opposite to the one where the rotor 5 is arranged to form a frustro-conical portion 2a, from which the shaft 4 is further projecting by a given distance to constitute a capstan shaft. The illustrated motor is a so-called direct drive type and the bearing holder 2 of the motor is rigidly fitted to a chassis while it is firmly holding the shaft 4.

FIG. 6 of the accompanying drawings illustrates a known belt driving type motor comprising a shaft and a flywheel 7 fitted to its lower end and a belt 8 arranged to partly surround the outer periphery of the flywheel 7. In this belt driving type motor, again, a bearing holder 2 is rigidly fitted to a chassis while it is firmly holding a shaft 4.

When an upper portion of the motor shaft is used as a capstan shaft, it provides a reference speed for continuously feeding a tape to a recording or reproducing head and pinch rollers and other components of a tape feeding system are arranged by referring to the capstan shaft. Besides, a control head, an audio head and other components of a signal retrieving system as well as a number of components of other systems of a video tape recorder are arranged near the capstan shaft. These and other parts of a video tape recorder other than the motor are, in most cases, securely fitted to a chassis separately and independently from the motor.

When components of a video tape recorder other than a motor are rigidly but independently fitted to a chassis, however, they tend to be fitted differently from each other in terms of working standards so that system and a signal retrieving system may be mounted according to different standards, giving rise to a problem of inadequate mounting precision. This problem has to be seriously addressed if a video tape recorder is to be realized with excellent precision. Moreover, the number of components has been increasing in recent years which tends to lower the productivity and raise the manufacturing cost of such a video tape recorder.

SUMMARY OF THE INVENTION

It is therefore an object of the present invention to provide an electric motor that allows a simple and common standard for mounting a tape feeding system, a signal retrieving system and other systems of a video tape recorder.

According to a first aspect of the invention, the above object is achieved by providing a mechanism comprising a base, a motor having a rotor, a rotor shaft and a stator portion, said motor being fixed on the base with the rotor shaft and the rotor being arranged on opposite sides of the base and the stator portion having a standard portion as an installation standard for other parts adapted to be assembled with said motor. The standard portion is arranged on the same side of the base as the rotor shaft.

Also in accordance with the invention, a motor comprises a rotor, a rotor shaft and a stator portion; the stator portion has a standard portion for installation of another part. The standard portion and the rotor shaft are arranged on the same side of the rotor.

According to another aspect of the invention, components fitted to the stationary member of an electric motor having a configuration as described above are those of a video tape recorder.

With an electric motor having a configuration as described above, components of an apparatus, e.g., a video tape recorder other than the motor, are rigidly fitted to a stationary member and therefore a common standard can be provided for securing the components.

Now, the present invention will be described in greater detail by referring to the accompanying drawings that illustrate preferred embodiments of the invention.

DETAILED DESCRIPTION OF THE INVENTION

Figure 1:
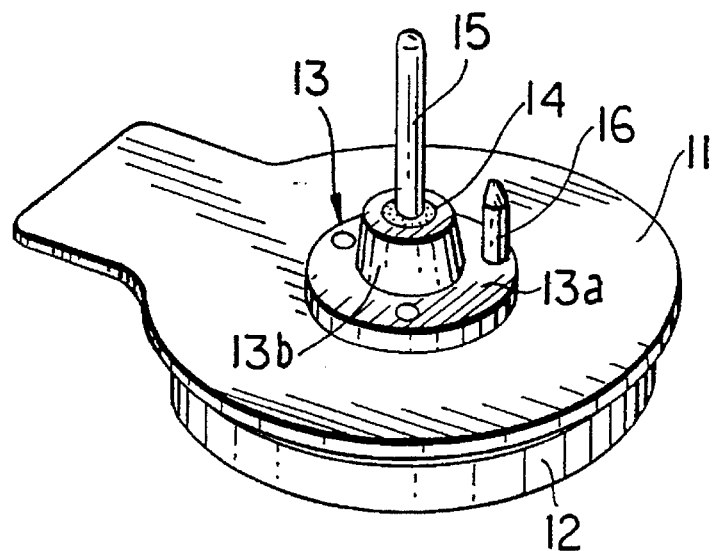
FIG. 1 is a schematic perspective view of a first embodiment of the present invention, which is a capstan motor.

Referring firstly to FIG. 1, that figure shows a first embodiment of the present invention, which is a capstan drive motor to be used for the tape feeding system of a video tape recorder (VTR). A wheel-shaped rotor 12 is arranged vis-a-vis the lower surface of a substantially circular substrate 11 and a flange 13a of a bearing holder 13 is rigidly fitted to the upper surface of the substrate 11. A shaft 15 is rotatably held in and through the bearing holder 13 and the hub of the rotor 12 is fitted to the lower end of the shaft 15 so that the rotor 12 rotates with the shaft 12.

As seen in FIG. 1, the bearing holder 13 has a frustro-conical portion 13b projecting upwardly from the flange 13a and the shaft 15 projects upwardly even further from the frustro-conical portion 13b by a given distance to become a capstan shaft.

A stationary pin 16 stands upwardly from the flange 13a of the bearing holder 12 for rigidly holding components of the video tape recorder other than the motor such as the AC head of the signal retrieving system of the video tape recorder.

Since the AC head of the signal retrieving system of the embodiment is rigidly fitted to the stationary pin 16 arranged on the motor of the tape feeding system and therefore according to a standard of securing components which is common with that of securing the components of the signal retrieving system of the video tape recorder, the operation of tape feeding and that of signal retrieval can be carried out precisely on a common basis.

Figure 2:
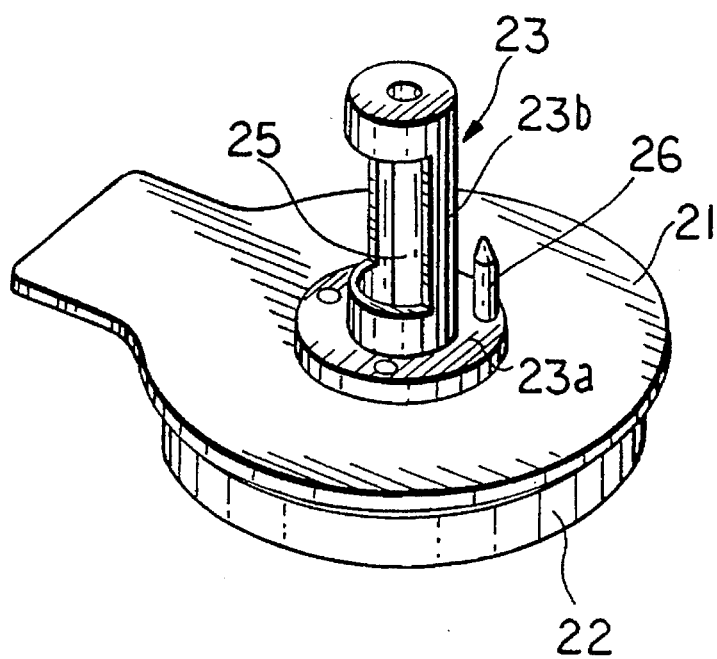
FIG. 2 is a schematic perspective view of a second embodiment of the present invention, which is also a capstan motor.

FIG. 2 illustrates a second embodiment of the invention, wherein the trunk of a bearing holder is realized in the form of a so-called center. More specifically, the bearing holder 23 has a supporting pillar 23b that axially extends along a capstan shaft 25 so that the latter is rotatably held by the bearing holder 23 at the top. The remaining components of the embodiment are similar to those of the first embodiment including a stationary pin 26 standing from the flange 26 of the bearing holder 23.

It may be seen that this second embodiment operates in a manner similar to that of the first embodiment and is as effective as the latter.

Figure 3:
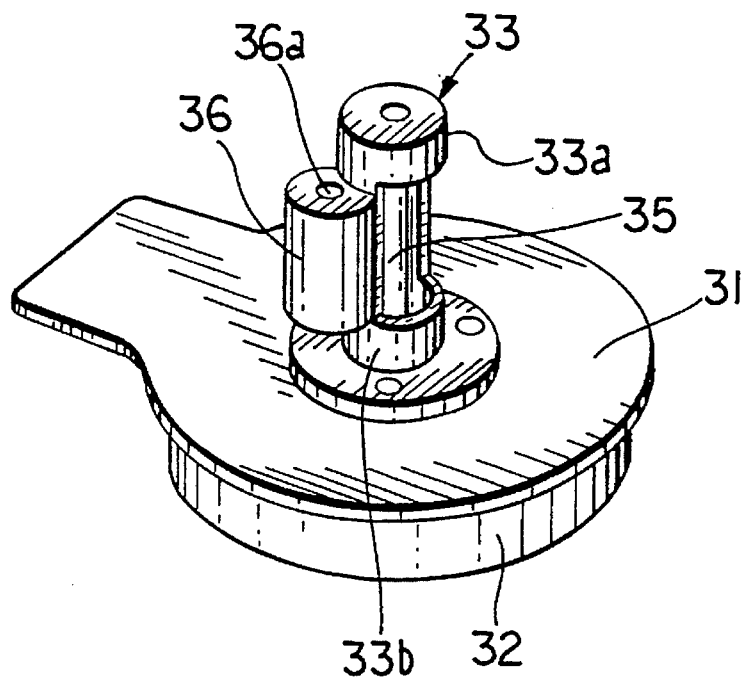
FIG. 3 is a schematic perspective view of a third embodiment of the present invention, which is also a capstan motor.

FIG. 3 illustrates a third embodiment of the invention, wherein a supporting pillar 33b of a center type bearing holder 33 is provided with a fixture sleeve 36 having a semicircular cross section and formed as an integral part thereof. The fixture sleeve 36 has an axial through bore 36a extending in parallel with a capstan shaft 35 so that an AC head 50 of the signal retrieving system of a video tape recorder can be rigidly fitted into the through bore 36a.

Again, it may be seen that this third embodiment operates in a manner similar to that of the first or second embodiment and is as effective as these embodiments.

Figure 4:
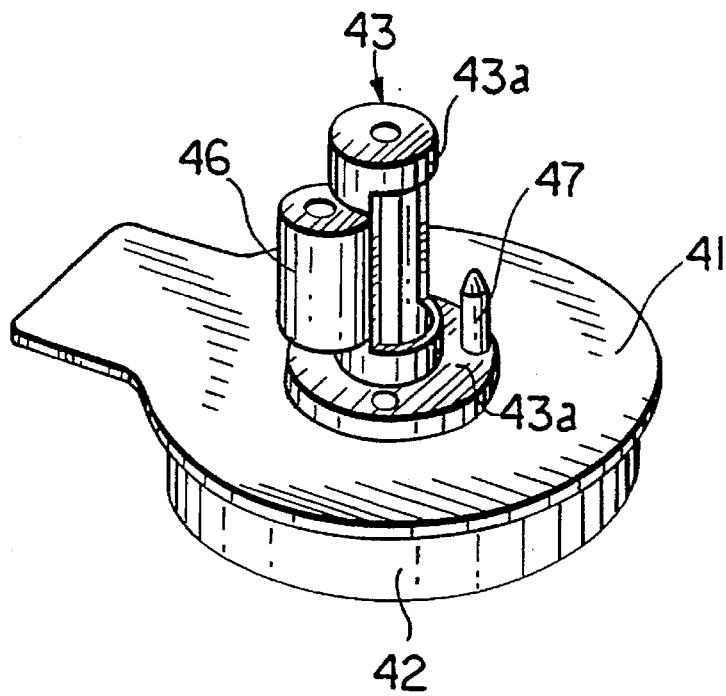
FIG. 4 is a schematic perspective view of a fourth embodiment of the present invention, which is also a capstan motor.
Figure 5:
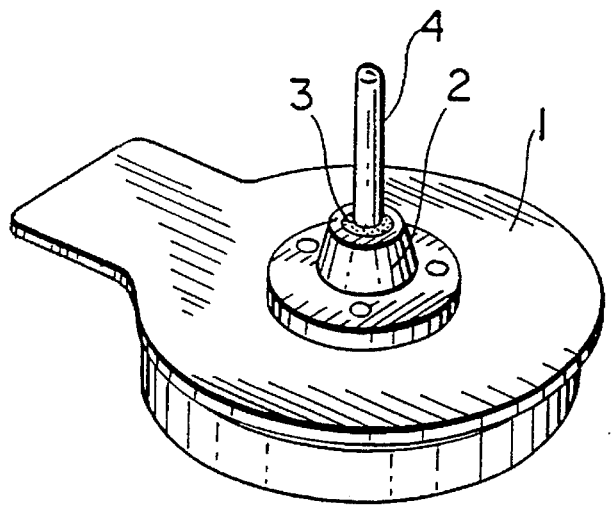
FIG. 5 is a schematic perspective view of a conventional motor.
Figure 6:
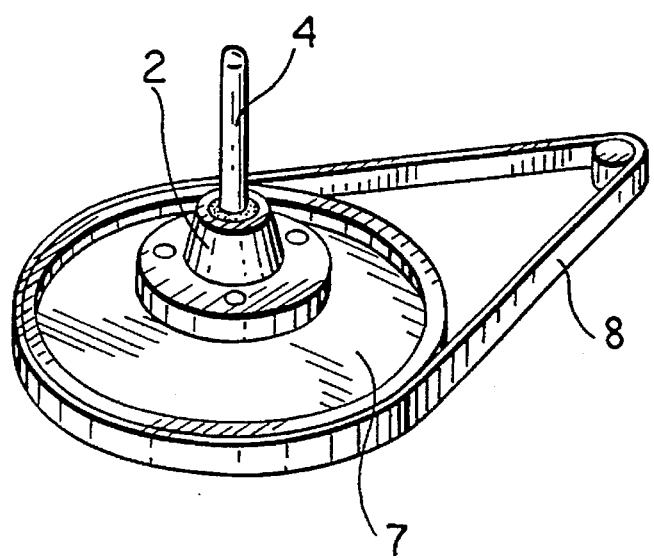
FIG. 6 is a schematic perspective view of another conventional motor.

In FIG. 4, showing a fourth embodiment of the invention, a supporting pillar 43b of a center type bearing holder 43 is provided with a fixture sleeve 36 having a semicircular cross section and is formed as an integral part thereof and, at the same time, a stationary pin 47 stands upwardly from the flange 43a of the bearing holder 43 so that an AC head of the signal retrieving system of a video tape recorder can be rigidly fitted to the bearing holder 43 as well as to the stationary pin 47.

Once again, it may be seen that this fourth embodiment operates in a manner similar to that of the first, second or third embodiment and is as effective as these other embodiments.

Figure 7:
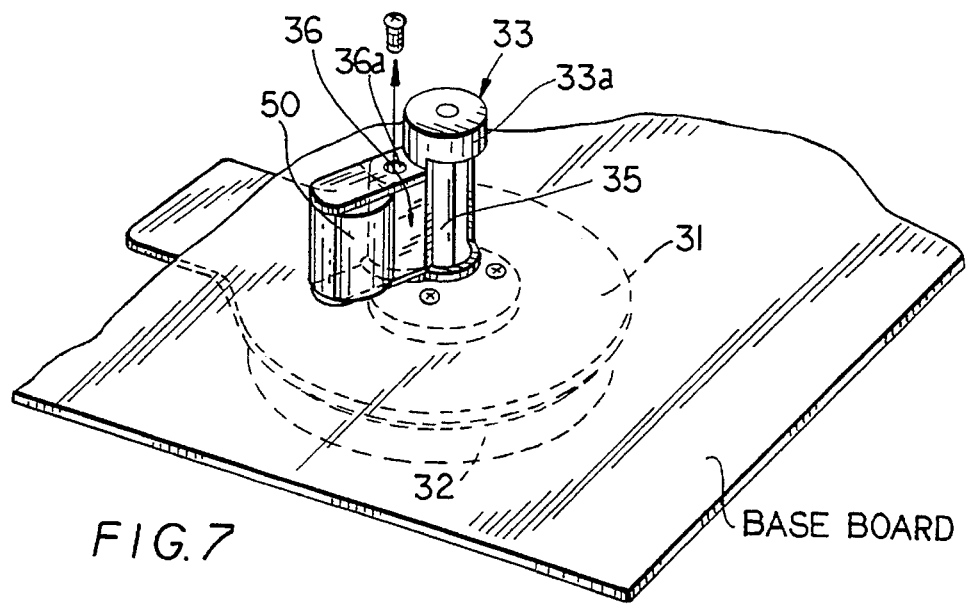
FIG. 7 is a perspective assembly view showing the mounting of the embodiment shown in FIG. 3 on a base board.
Figure 8:
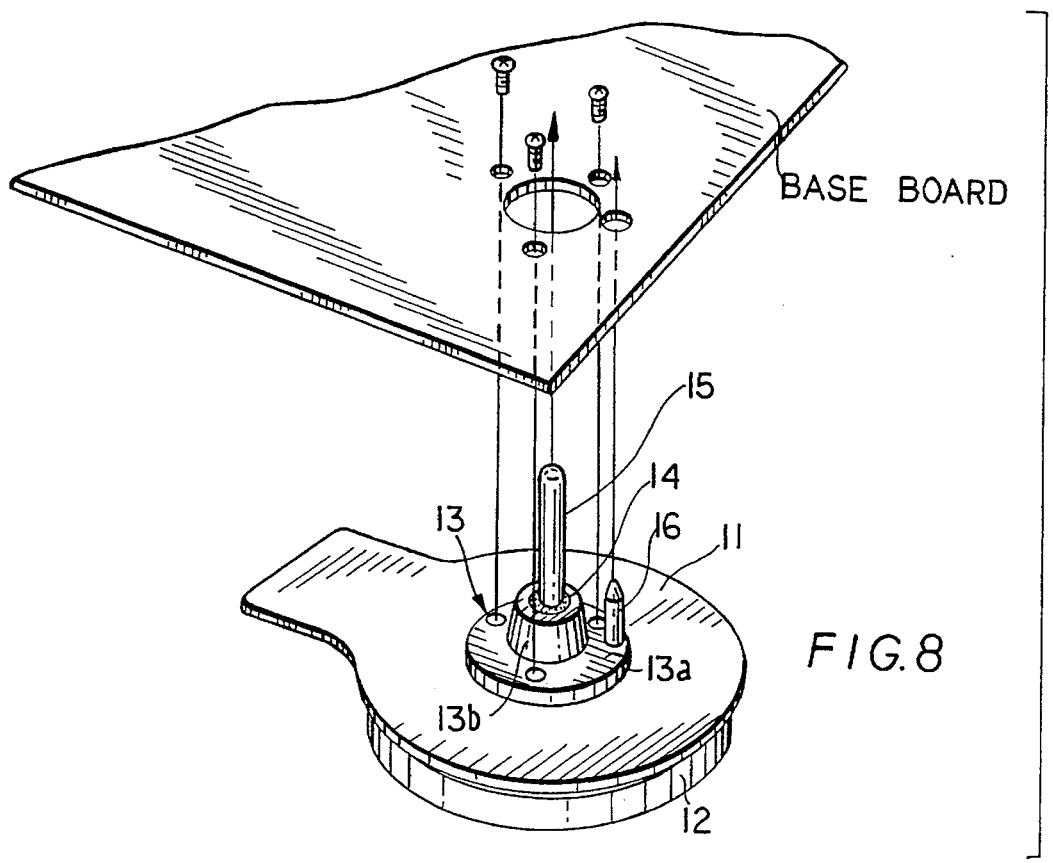
FIG. 8 is a perspective assembly view showing how the motor of FIG. 1 is assembled on a base board.

In FIG. 7, the embodiment of FIG. 3 is shown affixed to a base board. In FIG. 8, the embodiment of FIG. 1 is shown being assembled on a base board.

While each of the above embodiments is provided with a stationary member for holding a head, it may be used for holding components other than a head and/or one or more than one stationary members may be additionally provided for securely holding components other than a head. Moreover, the concept of the present invention may be applied to not only a capstan motor but also a reel motor, loading motor or some other motor having a bearing system.

As may be apparent from the above description, since an electric motor according to the present invention is provided with a stationary member arranged on a motor bearing holder for securely holding components of a video tape recorder other than a motor, it allows a simple and common standard to be implemented for mounting a tape feeding system, a signal retrieving system and other systems of the video tape recorder so that those components may be mounted with improved accuracy. Moreover, with such an arrangement, the number of components of a video tape recorder may be reduced to enhance the productivity and lower the manufacturing cost.

While the foregoing description and drawings represent the preferred embodiments of the present invention, it will be obvious to those skilled in the art that various changes and modifications may be made therein without departing from the true spirit and scope of the present invention.

What is claimed is:

1. A mechanism comprising:

a base;

a motor having a rotor, a rotor shaft and a stator portion, said stator portion comprising a bearing holder for supporting said rotor shaft;

said motor being fixed on the base with the rotor shaft and the rotor being arranged on opposite sides of said base; and said bearing holder having a standard portion as an installation standard for other parts adapted to be assembled with said motor;

said standard portion being arranged on the same side of the base as said rotor shaft; and wherein said standard portion includes a stationary pin for rigidly holding another component.

2. The mechanism of claim 1 wherein said bearing holder includes a central supporting pillar which axially extends along said rotor shaft, said supporting pillar rotatably holding said rotor shaft at a top portion thereof.

3. The mechanism of claim 2 wherein said supporting pillar also includes a fixture sleeve as said standard portion with a through bore for mounting another component.

4. A motor comprising:

a motor;

a rotor shaft; and a stator portion, said stator portion comprising a bearing holder for supporting said rotor shaft;

said bearing holder having a standard portion for installation of another part;

said standard portion and said rotor shaft being arranged on the same side of the rotor; and wherein said standard portion includes a stationary pin for rigidly holding another component.

5. A motor comprising:

a motor:

a rotor shaft; and a stator portion, said stator portion comprising a bearing holder for supporting said rotor shaft;

said bearing holder having a standard portion for installation of another part;

said standard portion and said rotor shaft being arranged on the same side of the rotor;

wherein said standard portion includes a central supporting pillar which axially extends along said rotor shaft, said supporting pillar rotatably holding said rotor shaft at a top portion thereof; and wherein said supporting pillar also includes a fixture as said standard portion with a through bore for mounting another component.

\* \* \* \* \*